(12) United States Patent
Epping

(10) Patent No.: US 11,589,702 B2
(45) Date of Patent: Feb. 28, 2023

(54) MODULAR FOAMING UNIT

(71) Applicant: CUP&CINO KAFFEESYSTEM-VERTRIEB GMBH & CO. KG, Hövelhof (DE)

(72) Inventor: Frank Josef Paul Epping, Hövelhof (DE)

(73) Assignee: CUP&CINO KAFFEESYSTEM-VERTRIEB GMBH & CO. KG, Hövelhof (DE)

( * ) Notice: Subject to any disclaimer, the term of this patent is extended or adjusted under 35 U.S.C. 154(b) by 454 days.

(21) Appl. No.: 16/319,219

(22) PCT Filed: Aug. 7, 2017

(86) PCT No.: PCT/EP2017/069885
§ 371 (c)(1),
(2) Date: Jan. 18, 2019

(87) PCT Pub. No.: WO2018/029125
PCT Pub. Date: Feb. 15, 2018

(65) Prior Publication Data
US 2019/0274472 A1 Sep. 12, 2019

(30) Foreign Application Priority Data
Aug. 9, 2016 (EP) .................................. 16183381

(51) Int. Cl.
A47J 31/44 (2006.01)
A47J 31/54 (2006.01)
A47J 31/60 (2006.01)

(52) U.S. Cl.
CPC ......... A47J 31/4485 (2013.01); A47J 31/542 (2013.01); A47J 31/60 (2013.01)

(58) Field of Classification Search
CPC ...... A47J 31/4485; A47J 31/542; A47J 31/56; A47J 31/60
See application file for complete search history.

(56) References Cited

U.S. PATENT DOCUMENTS 8,357,416 B2 1/2013 Schindler et al.
9,211,032 B2 * 12/2015 Larson ................ A47J 31/4485
(Continued)

FOREIGN PATENT DOCUMENTS

DE 102008058934 A1 5/2010
EP 2583598 A1 4/2013
(Continued)

OTHER PUBLICATIONS

International Search Report (dated Oct. 23, 2017) for corresponding International App. PCT/EP2017/069885.

Primary Examiner — Dana Ross
Assistant Examiner — Lawrence H Samuels
(74) Attorney, Agent, or Firm — WRB-IP PLLC

(57) ABSTRACT

A device for foaming liquid includes a line system and a pump, via which at least one first line of the line system is connectible to at least one storage container in which the liquid to be foamed is stored, and via a second line of the line system is connectible to at least one outlet nozzle, an air-enrichment element by means of which air can pass through the liquid, and a heating element designed as a continuous flow heater. Furthermore, the heating element is arranged in the second line of the line system of the device and is designed as a thick-film heater in which an electric heating resistor is attached to a carrier using thick-film technology, on which carrier a flow path is provided for the liquid.

19 Claims, 1 Drawing Sheet

(56) References Cited

U.S. PATENT DOCUMENTS

| | | | | |
|---|---|---|---|---|
| 2005/0233043 A1* | 10/2005 | Dirren | ........... | A47J 31/4485 |
| | | | | 426/569 |
| 2007/0031558 A1* | 2/2007 | Lussi | ........... | A47J 31/4482 |
| | | | | 426/520 |
| 2009/0068331 A1* | 3/2009 | Muheim | ........... | A47J 31/4496 |
| | | | | 426/474 |
| 2009/0087532 A1* | 4/2009 | Meier | ........... | A47J 31/4485 |
| | | | | 426/474 |
| 2010/0075007 A1* | 3/2010 | Schindler | ........... | A47J 31/4485 |
| | | | | 426/474 |
| 2015/0024103 A1* | 1/2015 | Bronnimann | ........... | A47J 31/4485 |
| | | | | 99/290 |
| 2016/0135474 A1* | 5/2016 | Vetterli | ........... | B01F 35/90 |
| | | | | 99/452 |

FOREIGN PATENT DOCUMENTS

| | | | | |
|---|---|---|---|---|
| EP | 2987435 A1 | | 2/2016 | |
| EP | 3023037 A1 | | 5/2016 | |
| EP | 3042592 A1 | * | 7/2016 | ........... G01K 13/20 |
| EP | 3042592 A1 | | 7/2016 | |
| WO | 2004062443 A2 | | 7/2004 | |
| WO | 2011115925 A1 | | 9/2011 | |
| WO | 2014205771 A1 | | 12/2014 | |
| WO | WO-2014205771 A | * | 12/2014 | ........... A47J 31/542 |

\* cited by examiner

MODULAR FOAMING UNIT

BACKGROUND AND SUMMARY

The invention describes a device for foaming a liquid, in particular milk or milk substitute.

The coffee culture which has developed and the cult status of a coffee beverage connected therewith has led to a wide-ranging offer of coffee-containing beverages. In the meantime a large number of collie machines are available for the preparation of coffee beverages, ranging from a manual system to a completely automated one. The coffee specialties producible with the coffee machines also include drinks, such as cappuccino, latte macchiato or café latte, which require for their preparation milk and milk foam. For this purpose a supply of milk is needed in or at a coffee machine, which makes a cooling necessary, for reasons of storage life, freshness and hygiene.

Known from the state of the art are diverse milk codling devices, which are designed for installation in a beverage maker, in particular a coffee machine, or for external connection to a beverage maker, in particular as auxiliary device. In order to be able to maintain freshness and hygiene of open milk over a longer period of time, milk is stored ideally at 4° C. Similar conditions apply for so-called milk substitute.

Likewise known are diverse devices for milk foam preparation, which find application in the coffee machine or also as auxiliary device and which produce warm or respectively hot or cold milk foam. For generation of warm or respectively hot milk foam, milk foamers generally comprise a storage container, in which the milk is heated. By means of a pump, the milk is conducted from the storage container via a line to an outlet nozzle and in an air-enrichment element is thereby enriched with air or respectively air is passed there-through. This is disadvantageous in view of the storage life of the stored milk and is problematic owing to an increased germ formation in particular in the line system and the elements coming into contact with the milk. The production of cold milk foam takes place, as a rule, in a separate system.

Known from DE 10 2008 058 934 A1 is a milk foamer comprising a storage container, from which liquid is extractable, a pump and an outlet nozzle, as well as an air-enrichment element, by means of which air is able to be passed through the liquid. The milk enriched in this way is pressed through a sieve at an outlet nozzle, so that a stable foam results. Downstream from the air-enrichment element is a heat exchanger, which is designed either as continuous flow heater for generation of warm milk foam or as cooling element for generation of cold milk foam. Provided for control of the cooling capacity of the heat exchanger is a temperature sensor, in order to cool the cold drink to 1° C. to 5° C. A combined device for selective production of hot and cold foam is not described.

Known from WO 2008/083941 A1 is a milk foam system for production of cold milk foam and warm milk foam. Cold milk is sucked out of a container, is possibly mixed with a certain portion of air and is led to an outlet. Foreseen furthermore is that provided in the outlet line is a parallel section, able to be switched on selectively via a valve, in which section a continuous flow heater is disposed in order to produce, selectively, cold or hot milk or respectively cold or hot milk foam. This system comprises a complex system of lines and valves which makes a higher investment in cleaning necessary.

Known from EP 3 042 592 A1 is a device for production of cold, warm and hot milk or respectively milk foam, whereby a cold milk-air emulsion can be selectively heated by meat as of a heat exchanger to a medium temperature or, via an alternative flow path, can be heated, by means of steam injection, to a higher temperature. This system comprises multiple line paths and multiple heating devices, which require a complicated cleaning.

It is desirable to design a device as initially mentioned in such a way that a compact device is made available for selective production of hot/warm and cold foam. The compact device is included in a modular unit, which is able to be disposed in a cooling device.

According to an aspect of the invention, the device is suitable for foaming liquid, in particular milk and/or milk substitute. The terms milk and milk substitute encompass those products which are suitable for preparation of a hot beverage, in particular coffee beverages and/or milk drinks, for example whole milk, reduced-fat milk, soya milk, almond milk, etc.

The device for foaming liquid comprises a line system and a pump, via which at least one first line of the line system is connectible to at least one storage container in which the liquid to be foamed is stored, and via a second line of the line system is connectible to at least one outlet nozzle; an air-enrichment element by means of which air can pass through the liquid; and, a heating element designed as a continuous flow heater. In particular the heating element is disposed in the second line of the line system and is designed as thick film heater, in which an electric heating resistor is attached to a carrier using thick-film technology, on which carrier a flow path is provided through which the liquid flows.

The device for foaming liquid is accommodated in a housing, on which ducts for lines of fluids and connections are provided. In particular the device is connectible to further devices, for example for electric contacting and/or for contacting with a control unit. Besides an air suction device, the device comprises a line system with one or more first lines, in order to connect it detachably to at least one storage container, in which at least one liquid to be foamed is stored. The stored liquid is extractable from the at least one storage container by means of a pump. Furthermore the pump is connected via a second line to at least one outlet nozzle, at which the produced foam of the liquid is able to be withdrawn. The outlet nozzle can be provided, for example, on a coffee machine, in particular a fully automated coffee machine.

For example, foreseen is that the device for foaming liquid is in connection with at least two storage containers. Thus taken selectively from a first storage container can be hole milk and from a second container reduced-fat milk, soya milk, rice milk or other milk substitutes. Disposed in the at least one first line, which connects the storage container or containers to the pump, is at least one valve in order to be able to extract selectively liquid from the one or other storage container.

The liquid extracted from the at least one storage container is enriched with air from the surrounding area, for example in a pressureless way, in a correspondingly designed air-enrichment element, whereby the liquid froths up and forms a stable foam. Included are, for example, a proportional valve with a nozzle, whereby preferably air is suctioned intermittently or respectively in a pulsed way.

The device for foaming liquid further comprises a heating element, which, in the direction of flow of the liquid, is disposed behind the pump and behind the air-enrichment element. The milk, already enriched with air, can be warmed or respectively heated in the heating element, which has an advantageous effect for the foaming up of the milk and the formation of a stable foam.

Proven to be very advantageous is the design of the heating element in the form of a continuous flow heater, which can be simply integrated in a line system of the device and provides a flow path for the liquid to be brought to temperature. The device can thereby be designed in a compact and space-saving way.

According to the invention, the heating element is based on thick-film technology and will be designated in the following as a thick-film heater. Such a heating element is described, for example, in EP 2 163 130 A, the heating element being suitable for heating liquids. In principle a corresponding heating element comprises a heat transfer element with a heating region, on which an electrical resistance-heating device is attached or respectively deposited as thick-film heating element. The thick-film heating element generally comprises a resistive heater track on a carrier or respectively an insulating substrate, e.g. of glass, ceramic or other material. For formation of a heat transfer element, a flow path is provided on the carrier, for example. Further provided are corresponding electrical connections for electrical contacting of the electrical resistive heater track and of a temperature sensor. Methods for production of heating elements in thick-film technology are known. With a heating element of this kind a very quick regulation is possible with at the same time high process reliability and an advantageous cost and energy efficiency.

Provided in a suitable way on the carrier of the heating element is a flow path for the liquid to be heated, for example in the form of flow-through path disposed in a spiral shape in the heat transfer element. Thus a heating element designed as a continuous flow heater comprises a thick-film heating element implemented as electrical resistance heater and a corresponding beat transfer element which transfers the heat generated by the thick-film heating element to the liquid to be brought to temperature. The liquid thereby extracted from the at least one storage container, which in particular is cooled, is delivered, via an inlet, along a spiral-shaped flow-through path running from the outside to the inside, to an outlet and is heated along the flow path to a suitable temperature, preferably in a temperature range of 50° C. to 80° C. With a heating element constructed in such a way and short lines, a compact construction is achievable, so that the heating element is able to be disposed in a space-saving way in the device according to the invention.

The heating element of the device according to the invention for framing liquid offers the advantage that its heat buildup is minimal, i.e. the heat given off by it into the surrounding area is very minimal. Thus the device according to the invention with the integrated heating element can be placed in a cooling device. The heat given off by the heating element is thereby so limited that the cooling is affected only minimally or not at all.

For improved storage life of the milk and for hygienic reasons, it is preferred that the device for foaming liquid, in particular milk, be able to be accommodated in a cooling device. Thus it is preferred that the device according to the invention for foaming liquid be included in a cooling device in such a way that the connections for an electrical contacting and to a control unit are connectible to a coupling unit provided in the cooling device. The cooling device can be designed as an auxiliary device of a coffee machine, in particular of a fully automated coffee machine, or also as an independent cooling device, which is connectible to a coffee machine by means of corresponding connections.

In one embodiment, the device according to the invention for foaming liquid is able to be received in a modular unit, which is insertable into the cooling device, for example able to be pushed in or plugged in. The modular unit further comprises means for an electrical contacting and provides an air-tight connection to the liquids provided. The modular unit comprises the at least one storage container, which is received in the modular unit in an exchangeable way. A device for foaming liquid received in the modular unit is connectible to the at least one storage container. Preferably foreseen is that, instead or alternatively, a container with a rinsing solution for a cleaning cycle is insertable in the modular unit.

For the production of cold foam, cooled milk is taken from the at least one storage container and is enriched with air. The prepared milk flows along the flow path and passes the switched-off heating element to at least one outlet nozzle. By means of the arrangement of the device or respectively of the modular unit in a cooling device, the entire flow path of the milk to be frothed, or respectively the frothed milk, runs to a large extent in a cooled environment.

Owing to the preferred construction, the heating element, except for a short phase during the switched-on state, is to a large extent brought to ambient temperature. Thus it is possible that, one after the other, first warm foam is generated with the device according to the invention for foaming liquid and then subsequently, with the same device, cold foam. The device according to the invention for foaming liquid is suitable for both milk foams, whereby a simple system is achievable and no two separate devices with corresponding connections, elements and lines are necessary. In particular, during the production of warm foam, liquid to be frothed can be taken from the at least one storage container, can be enriched with air, and can be heated to a desired temperature in the switched-on heating element while flowing through. The heating element is switched off when the desired quantity of milk foam has passed the heating element. Preferably the heating element is switched off before the end of the milk foam process, whereby cold liquid subsequently flowing through, in particular cold milk, milk substitute or water, cools the heating element. Alternatively, the heating element can also be cooled by rinsing with cold water within the framework of a rinsing step. The step of cooling of the heating element takes place in a short time span, for example within about 3 seconds. Thus the heating element is cold, except for the short heating phase. Moreover this is optimal in order to counteract a buildup of germs and contamination which greatly increases with rising temperature. Furthermore it is not necessary with complex measures to bring out of the system the heat-up energy arising from the heating element.

Another problem of devices for foaming liquids, in particular milk, is the complicated cleaning of such a device. Cyclical rinsings are necessary during a running operation and also an intensive cleaning at the end of the day. Cyclical rinsings of the lines of the line system as well as of those elements which come into contact with milk, e.g. the pump, the heating elements etc., lead, as a rule, to high water and milk losses. The integration of the device according to the invention for foaming liquid in a cooling device minimizes the germ formation so that it is possible to carry out cleaning cycles with a lesser frequency. Furthermore, through the compact construction able to be achieved with the device according to the invention, the line paths are significantly shortened, whereby fewer losses arise with the cleaning cycle.

In one embodiment, the device according to the invention for foaming liquid can be connected to a container in which a rinsing solution is stored, instead of the at least one storage container. This rinsing solution can be e.g. water and/or an acidic or alkaline cleaning solution. In a cleaning cycle, by means of the pump, rinsing solution can be rinsed through the line system of the device, for example also in circuit, i.e. the rinsing solution is led via corresponding valves and connections back into the container of the rinsing solution. During a cleaning cycle the elements in contact with the liquid to be foamed as well as the valve at the air inlet can thereby be cleaned.

In an embodiment of the device according to the invention for foaming liquids a conductance sensor is disposed in the line system, so that via the detected conductance it can be determined which liquid is present in the line system, i.e. air, water, rinsing solution. Determined furthermore cant be whether a sufficient cleaning has been carried out.

BRIEF DESCRIPTION OF THE DRAWINGS

Further details, features and advantages of the present invention emerge from the following description of a special embodiment example with reference to the drawings.

DETAILED DESCRIPTION

Figure 1:
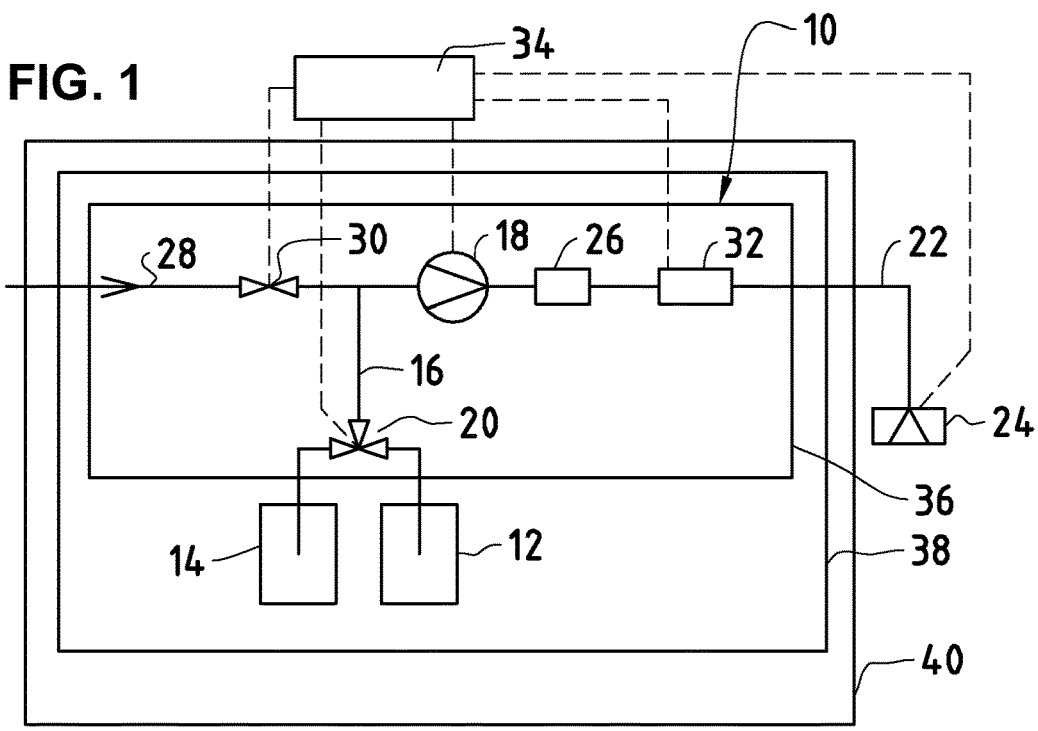
FIG. 1 shows a block diagram of a first configuration according to the invention and FIG. 2 shows a block diagram of a second configuration according to the invention during a cleaning cycle.

Designated by 10 in FIG. 1 is a device for foaming liquid. As can be learned from FIG. 1, milk of one type is stored in a first storage container 12, and milk of another type, or respectively milk substitute, is stored in a second storage container 14. The first and second storage containers 12, 14 are connected via a first line 16 to a pump 18. Disposed in the first line 16 is a valve 20, so that milk or milk substitute can be taken selectively out of the first or the second storage container 12, 14. The pump 18 is connected on its pressure side via a second line 22 to an outlet nozzle 24. Thus milk or milk substitute can be conducted to the outlet nozzle 24 out of one of the first or second containers 12, 14.

Included in the second line 22 is an air-enrichment element 26. Via an air supply line 28 with a valve 30 air can be suctioned via an inlet opening (not shown in more detail) which air enriches the suctioned liquid.

Disposed in the second line 22 is a heating element 32 designed as continuous flow heater. Provided on the heating element 32 is a spiral-shaped flow path for the milk enriched with air. During the flow along the flow path the enriched milk, with switched-on heating element 32, is warmed or respectively heated up to a predetermined temperature. The temperature can be regulated by means of a temperature sensor.

Provided for control of the device is a control unit 34, which is connected to individual elements of the device 10, for example the valves 20, 30, the pump 18, the heating element 32 and the outlet nozzle 24, and controls these elements according to the requirements for production of a stable milk foam. By means of the control unit 34, the production of a portion of milk foam can be triggered, whereby the air quantity, the amount and type of milk as well as the temperature of the milk foam can be specified.

Indicated in FIG. 1 is that the device 10 for foaming milk is disposed in a housing 36, Indicated only schematically furthermore is that the housing is included in a modular unit designated by 38. Included in the modular unit 38 are the first and second storage containers 12, 14. The device 10 for foaming milk and the modular unit 38 are included, according to the invention, in a cooling device which is indicated in FIG. 1 by the reference numeral 40. It can be seen that virtually all components of the device 10 for foaming milk are included in the cooling device 40, whereby the milk in the first and second storage containers 12, 14 and substantially in the line system of the device 10 for foaming liquid is cooled. The cooling device 40 can thereby be designed as an auxiliary device for a coffee machine or also as an integral component of a coffee machine.

For production of a warm foam, the heating element 12 is switched on by means of a control command from the control unit 34, so that the milk flowing through warms up and, coming out of the cooling device 40, is conducted to the outlet nozzle 24 located outside the cooling device 40.

The production of cold foam takes place in the same device 10 for foaming liquids, whereby the heating element 32 is just switched off. Through the advantageous design, the heating element 32, as an element of the device 10 for foaming liquid, can be disposed in the cooling device 40, since its waste heat in the switched-on state is minimal.

Figure 2:
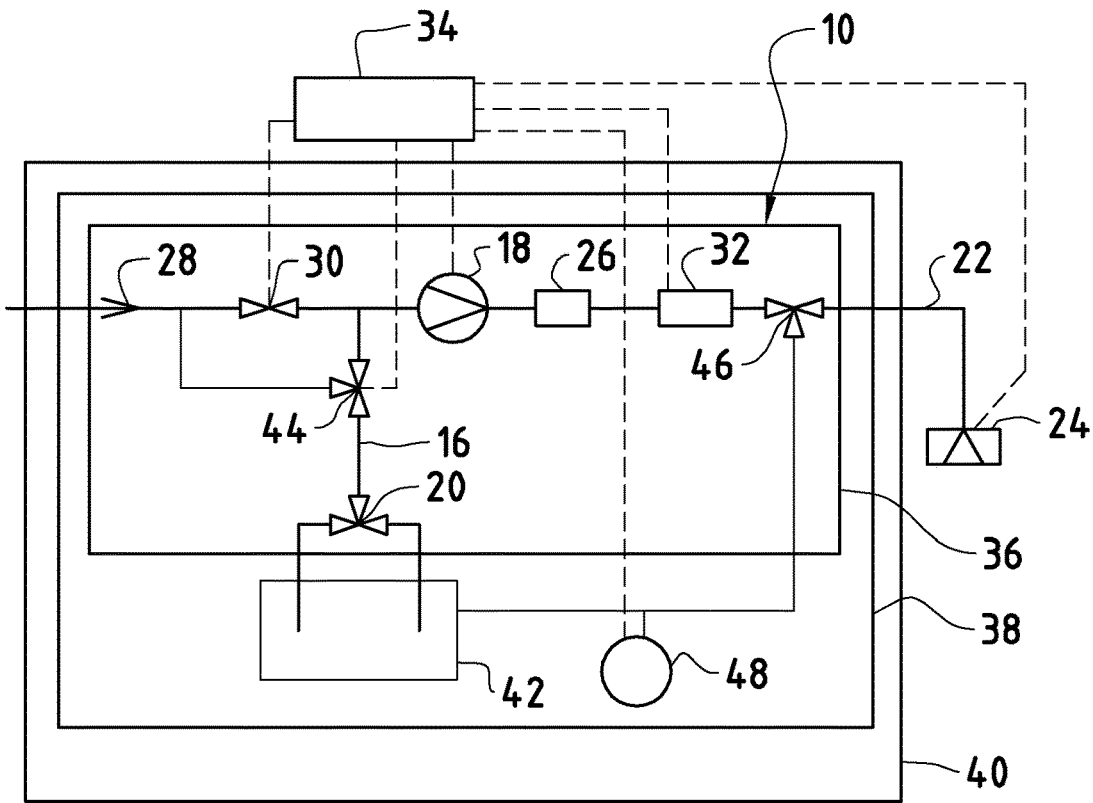

Shown in FIG. 2 is a block diagram of the device 10 for foaming milk in a second embodiment. Elements of the second embodiment corresponding to those of the first embodiment are designated by the same reference numerals. In FIG. 2, instead of the first and second storage containers 12, 14, a container 42 is included in the modular unit 38 and is connected to the device 10 for foaming liquid via the first line 16. Stored in the container 42 is a rinsing solution, which solution makes possible a cyclical rinsing of the line system and of the elements of the device 10 for foaming liquid, and/or which container stores a corresponding cleaning agent for an end-of-day cleaning. A control command coming from the control unit 34 enables the extraction of the rinsing solution from the container 42, whereby valves 44, 46 are provided in order to rinse the rinsing solution through the line system in such a way that all elements coming into contact with the milk can be rinsed and cleaned. In particular the valve 46 can be adjusted in such a way that the rinsing solution can be conducted in a circular flow. Furthermore in FIG. 2 a conductance sensor 48 is disposed in the rinse circuit. By means of the conductance sensors 48 it can be verified which liquid is present in the line system of the device 10 for foaming liquid. In particular proof can be provided as to whether a cleaning cycle has taken place.

The invention claimed is:

1. A device for foaming liquid, comprising
   at least one storage container in which liquid to be foamed is stored,
   a pump,
   a line system comprising at least one first line via which the at least one storage container is connectable to the pump, the line system comprising a single second line via which the pump is connectible to at least one outlet nozzle,
   an air-enrichment element by means of which air can pass through the liquid to produce a foam, wherein the air-enrichment element comprises a proportional valve with a nozzle,
   a heating element designed as a continuous flow heater,
   an air line connected to the at least one first line, wherein air is not pressurized in the air line, a controllable valve in the air line, and a control unit configured to control, during a milk foaming process, the controllable valve so that the pump suctions air into the at least one first line intermittently via pulses, wherein the heating element is a thick-film heater in which an electric heating resistor is attached to a carrier on which carrier a flow path is provided for the liquid, wherein the air-enrichment element and the heater are disposed on a pressure side of the pump, and wherein the air-enrichment element is disposed in the second line, upstream of the heating element.

2. The device according to claim 1, comprising a housing for receiving the device with connections that make available an electric contacting and a connection to a control unit and with ducts for the lines of the line system.

3. The device according to claim 1, wherein the liquid to be foamed is milk or milk substitute.

4. The device according to claim 1, wherein at least part of the device is adapted to be received in a cooling device.

5. The device according to claim 4, wherein at least part of the device is adapted to be received in a modular unit, the modular unit being insertable in the cooling device and in which the at least one storage container is received.

6. The device according to claim 4, wherein a control unit is adapted to be electrically coupled to the device.

7. The device according to claim 4, wherein the cooling device is an auxiliary device of a beverage maker.

8. The device according to claim 1, wherein the device is adapted to produce cold foam when the heating element is switched-off.

9. The device according to claim 1, wherein the device is adapted to produce warm foam when the heating element is switched-on.

10. The device according to claim 5, wherein receivable in the modular unit is a container which is filled with rinsing solution.

11. The device according to claim 10, wherein via the at least one first line the device is connectible to the container for the rinsing solution.

12. The device according to claim 11, wherein the line system, the pump, the air-enrichment element and the heating element are rinsed by means of the rinsing solution pumped in the circuit.

13. The device according to claim 1, wherein a conductance sensor is provided for determining the conductance value of a liquid present in the line system.

14. The device according to claim 1, comprising an air line connected to the at least one first line, the pump suctioning air into the at least one first line through the air line.

15. The device according to claim 1, wherein the heating element is configured to heat the foam to a temperature between 50-80° C.

16. The device according to claim 4, wherein the control unit is configured to turn on the heating element for production of a warm foam and switch off the heating element before an end of the milk foaming process.

17. The device according to claim 16, wherein at least the heating element is disposed in the cooling device.

18. The device according to claim 1, wherein the control unit is configured to turn on the heating element for production of a warm foam and switch off the heating element before an end of the milk foaming process.

19. The device according to claim 4, wherein at least the heating element is disposed in the cooling device.

* * * * *